United States Patent
Lyons et al.

[11] Patent Number: 5,907,192
[45] Date of Patent: May 25, 1999

[54] METHOD AND SYSTEM FOR WIND TURBINE BRAKING

[75] Inventors: James Patrick Lyons; Albert Andreas Maria Esser, both of Niskayuna, N.Y.; Paul Scott Bixel, Salem, Va.

[73] Assignee: General Electric Company, Schenectady, N.Y.

[21] Appl. No.: 08/871,171

[22] Filed: Jun. 9, 1997

[51] Int. Cl.[6] .................................. F03D 9/00; H02P 9/04
[52] U.S. Cl. ............................ 290/44; 290/42; 290/43; 290/55; 416/147; 416/163
[58] Field of Search ........................... 290/44, 43, 42, 290/55; 416/26, 32, 41, 23, 163

[56] References Cited

U.S. PATENT DOCUMENTS

| | | | |
|---|---|---|---|
| 4,355,955 | 10/1982 | Kisovec | 416/23 |
| 4,357,542 | 11/1982 | Kirschbaum | 290/44 |
| 4,435,646 | 3/1984 | Coleman et al. | 290/44 |
| 4,490,093 | 12/1984 | Chertok et al. | 416/26 |
| 4,565,929 | 1/1986 | Baskin et al. | 290/44 |
| 4,578,019 | 3/1986 | Safarik | 416/1 |
| 4,656,362 | 4/1987 | Harner et al. | 290/44 |
| 4,671,737 | 6/1987 | Whitehouse | 416/165 |
| 4,703,189 | 10/1987 | DiValentin et al. | 290/44 |
| 5,652,485 | 7/1997 | Spiegel et al. | 318/147 |
| 5,685,694 | 11/1997 | Jones et al. | 416/147 |

*Primary Examiner*—Elvin G. Enad
*Attorney, Agent, or Firm*—Ann M. Agosti; Marvin Snyder

[57] ABSTRACT

Stored rotational energy in an operating variable speed wind turbine is used to pitch blades and brake the wind turbine in the event of utility power grid failure. In one embodiment, a generator IGBT converter and the main power utility grid IGBT converter supply control and pitch servo power during turbine deceleration, and a ride-through capacitor on a DC emergency power supply bus and the main DC link capacitor provide additional energy storage. In another embodiment, a step-down DC/DC power converter adds to the intermediate DC link of the power conversion system with the secondary of the step down converter powering both the hub pitch controller and the wind turbine control system.

11 Claims, 2 Drawing Sheets

METHOD AND SYSTEM FOR WIND TURBINE BRAKING

FIELD OF THE INVENTION

This invention relates generally to the field of wind turbine power generation, and specifically, to a method and apparatus for braking a wind turbine in response to a loss of power in a utility power grid.

BACKGROUND OF THE INVENTION

Wind turbine generators require redundant braking systems in order to satisfy safety requirements, e.g., as specified by the insurer Germanischer Lloyd. A first brake system conventionally includes a disk brake capable of stopping a turbine against full wind torque and either a hydraulic accumulator or stored spring energy to enable operation in the event of a power failure. A second brake system conventionally uses aerodynamic braking to pitch the turbine blades into a feathered position and includes a stored energy source so that blade pitch can occur after a loss of power in a utility grid. Blade pitch has traditionally been accomplished on commercial wind turbines with a hydraulic ram and rotating coupling arrangement which can be readily backed up with a hydraulic accumulator.

Several recent wind turbine designs have incorporated electric servo pitch actuators to eliminate maintenance problems associated with hydraulic rams and accumulators. These systems require battery energy storage to enable blade pitch after utility grid power loss. The emergency batteries, however, have limitations related to size, weight, cost, and reliability. In particular the relatively uncontrolled temperatures in a wind turbine severely limit the life expectancy of the batteries.

SUMMARY OF THE INVENTION

It is therefore seen to be desirable to brake a wind turbine and pitch the blades thereof, in response to utility grid power loss, without using battery.

The stored rotational energy in an operating variable speed wind turbine can be used in accordance with the present invention to pitch the blades and hence brake the turbine in the event of the utility grid failure.

BRIEF DESCRIPTION OF THE DRAWING

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF THE PREFERRED EMBODIMENTS OF THE INVENTION

The present invention uses the stored rotational energy in an operating variable speed wind turbine 120 to pitch wind turbine blades 122 and hence brake the turbine in the event of a failure of a utility grid 124 (which in one embodiment is a three phase 50/60 hertz grid).

Figure 1:
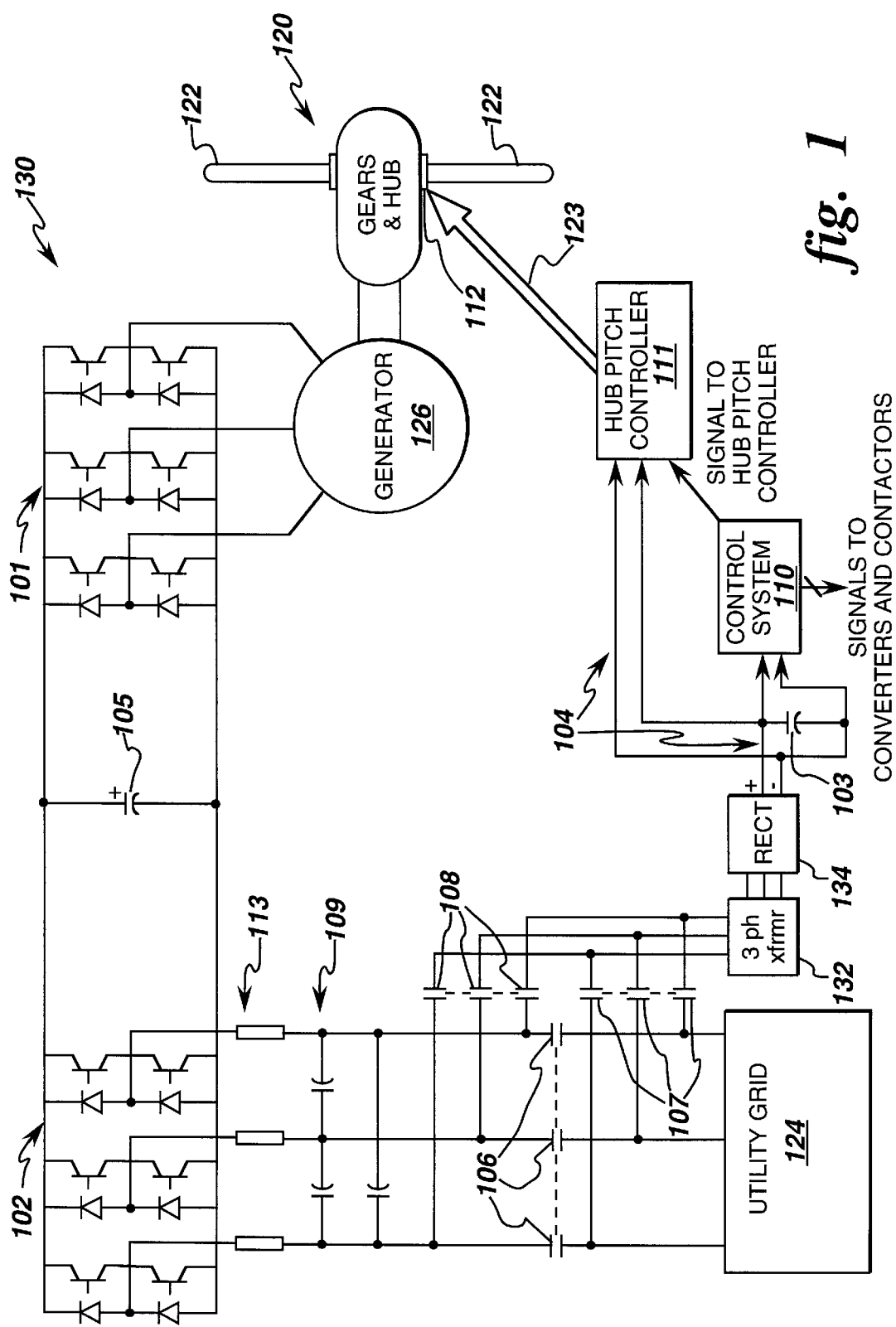
FIG. 1 depicts one embodiment of the invention including a ride-through capacitor added to the emergency power bus.

In the embodiment of FIG. 1, the emergency power system (wind turbine braking system 130) uses a generator IGBT converter 101 and a utility grid (main power) IGBT converter 102 to supply control and pitch servo power during turbine deceleration. A ride-through capacitor 103 on a DC emergency power bus 104 (which in one embodiment is a 325 volt bus) and a main DC link capacitor 105 provide additional energy storage. A three phase transformer 132 and a rectifier 134 can be used to convert the three phase signals from the utility grid and the grid converter to a single phase signal for a control system 110.

In the event of utility grid power loss, the control system will sense either undervoltage or out of frequency conditions in the grid converter 102, isolate the grid converter 102 from the utility grid by sending a signal to drop main contactors 106, reroute auxiliary power feed off of the utility grid by sending a signal to drop a second set of auxiliary contactors 107, and send a signal to energize a first set of auxiliary contactors 108 to thereby feed the emergency power supply bus 104 from the filtered output of the grid converter 102. The switch-over transient is estimated to last 5 cycles. Sufficient stored charge from ride-through capacitor 103 can be provided to prevent faulty operation of the control system during the switch-over transient.

The control system then switches operational modes of the generator converter 101 gating and regulates the DC bus voltage while extracting energy from the rotating inertia i.e. regeneratively braking the wind turbine. The control system also switches modes for the grid converter 102 gating regulating the voltage across filter inductors 113 and filter capacitors 109. The control system 110 can command the hub pitch controller 111 to initiate a rapid pitch of the electric pitch actuator 112 requiring peak servo power. Wire harness 123 includes control and power cables for feeding the servo drives. The power flow required by the pitch actuator 112 is a small fraction of that available from the main generator 126. Power flow can be maintained in balance with that required by the pitch drives by regulating the DC bus voltage with the generator converter 101. The torque control loop thus becomes a minor loop of a DC bus voltage regulator.

The control system signals generator converter 101 to continue electromagnetic braking, thereby recharging the DC link capacitor 105 until the turbine rotor slows to idle speed with the blades fully pitched and the pitch servo motor brakes set. At this point the control system will disable gating of the generator converter 101, leaving the DC link capacitor 105 with a substantial stored charge. The remaining charge in the large DC link capacitor 105 will be sufficient to ride through most utility grid outages, or if the utility grid is not restored, will provide time for an orderly shut-down of the turbine.

Figure 2:
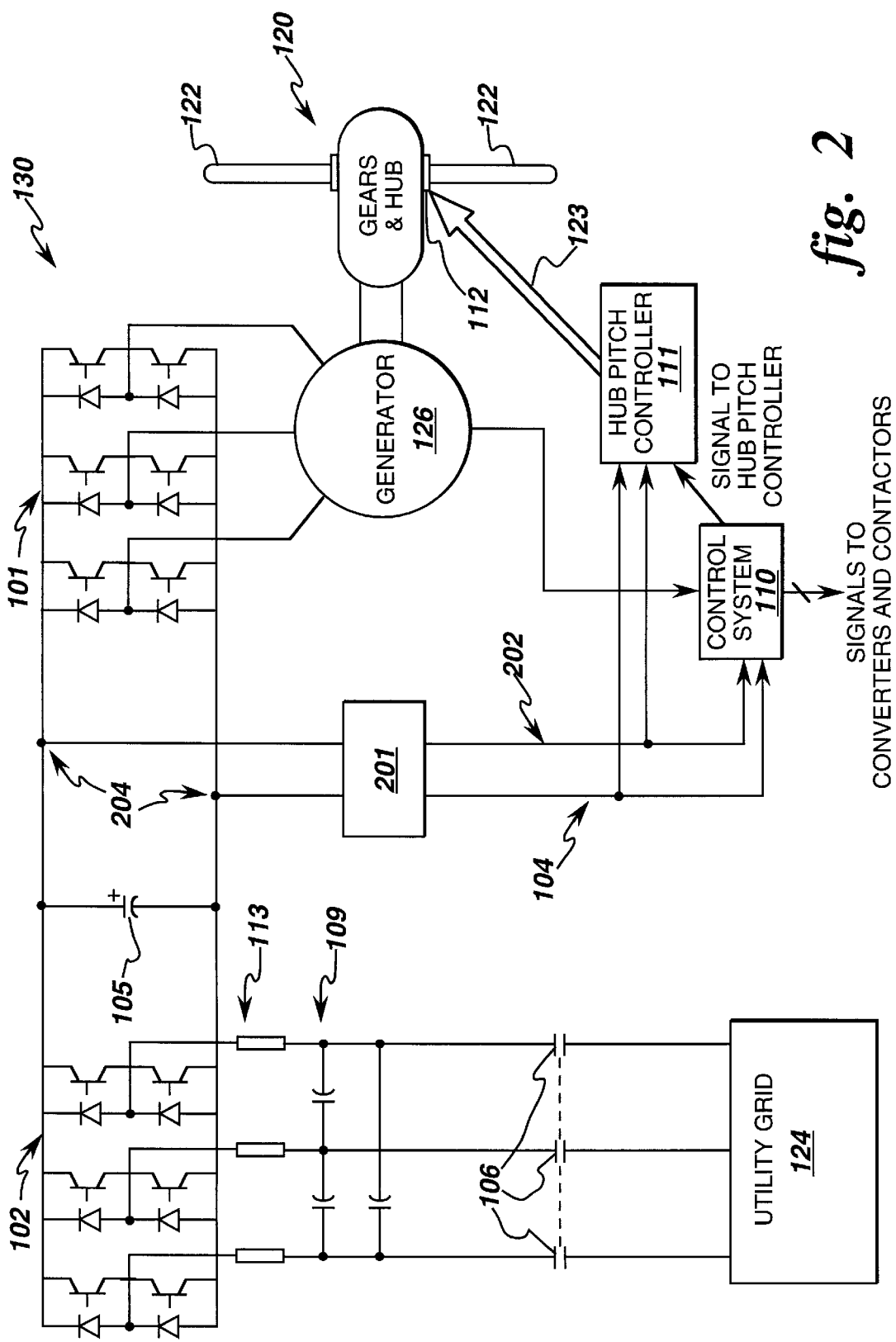
FIG. 2 depicts another embodiment of the invention using a step-down DC/DC power converter added to the intermediate DC link of the power conversion system.

An alternative embodiment, shown in FIG. 2, similarly uses the stored rotational energy in an operating variable speed wind turbine 120 to pitch blades 122 and hence brake the turbine. This embodiment, however, uses a step-down DC/DC power converter 201 added to the intermediate DC link 204 of the power conversion system. The secondary 202 of the step down converter is used to power both the hub pitch controller 111 and the control system 110.

In the event of utility grid power loss, control system 110 will sense either undervoltage or out of frequency condition of the grid converter 102 and then turn off the grid converter gating signals and drop main contactors 106. The control system will cause the generator converter 101 to switch operational modes and regulate the DC bus voltage while extracting energy from the rotating inertia to regeneratively brake the wind turbine. In this manner, the DC link capacitor 105 will recharge, with the grid converter 102 isolating the DC link from the collapsing utility grid. As in the embodiment of FIG. 1, the control system 110 will command the hub pitch controller 111 to initiate a rapid pitch of the electric pitch actuator 112, requiring peak servo power of approximately 10 kW in a 500 kW wind turbine system. The power flow required by the pitch servo drive motors is, again, a small fraction of that available from the main generator.

The control system will cause the generator converter 101 to continue electromagnetic braking, thereby recharging the DC link capacitor 105 until the turbine rotor slows to idle speed with the blades fully pitched and the pitch servo motor brakes set. Then the control system will disable gating of the generator converter 101, leaving the DC link capacitor 105 with a substantial stored charge. The remaining charge in the large DC link capacitor 105 will be sufficient to keep the control system powered for several minutes, providing sufficient time to ride through most utility grid outages, or if the utility grid is not restored, time for an orderly shut-down of the turbine.

While only certain preferred features of the invention have been illustrated and described, many modifications and changes will occur to those skilled in the art. It is, therefore, to be understood that the appended claims are intended to cover all such modifications and changes as fall within the true spirit of the invention.

We claim:

1. A wind turbine braking system comprising:
   a wind turbine including turbine blades, a control system, and an electrically-powered blade pitch actuator;
   a utility power grid;
   an emergency power supply bus for supplying power to the control system and the pitch actuator in the event of a loss of power in the utility power grid;
   a generator coupled to the turbine blades;
   a generator converter coupled to the generator;
   a DC link capacitor coupled to the generator converter; and
   a utility power grid converter coupled between the utility power grid and the DC link capacitor,
   in the event of a loss of power in the utility power grid, the generator converter being applied to extract energy via the generator from rotational inertia of the turbine blades and to use the extracted energy to charge the DC link capacitor for providing power to the control system and the pitch actuator via the emergency power supply bus to pitch the turbine blades into a feathered position.

2. The braking system of claim 1, further comprising a ride-through capacitor coupled to the emergency power supply bus, wherein in the event of a loss of power in the utility power grid,
   the control system is applied to initiate a switch-over to a filtered power output from the utility power grid to the emergency power supply bus, and
   the ride-through capacitor is applied to store transient power provided during the switch-over and to use the transient power to maintain proper operation of the control system during the switch-over.

3. The braking system of claim 2, wherein the utility power grid includes main contactors, and wherein the control system is applied to detect a loss of power in the utility power grid by sensing an undervoltage or out of frequency condition, and the control system is applied to initiate the switch-over by dropping the main contactors of the utility power grid and rerouting auxiliary power feed off the utility power grid.

4. The braking system of claim 3, further including a three phase transformer coupled to the utility power grid, and a rectifier coupled between the three phase transformer and the emergency power supply bus, and wherein the utility power grid includes a first set of auxiliary contactors each coupled at a first end between the utility power grid converter and a respective main contactor and at a second end to the three phase transformer, and a second set of auxiliary contactors each coupled at a first end between the utility power grid converter and a respective main contactor and at a second end to the three phase transformer, the control system being applied to reroute auxiliary power by dropping the second auxiliary contactors and energizing the first auxiliary contactors.

5. The braking system of claim 1, further comprising a step-down DC/DC power converter with a secondary thereof, wherein in the event of a loss of power in the utility power grid,
   the utility power grid converter is applied to isolate the DC link capacitor from the utility power grid; and
   the DC link capacitor is applied to use the extracted energy stored in the DC link capacitor to provide power to the pitch actuator via the emergency power supply bus via the step down converter and secondary thereof.

6. The braking system of claim 5, wherein the control system is applied to detect a loss of power in the utility power grid by sensing an undervoltage or out of frequency condition, and the control system is applied to initiate the switch-over by turning off gating signals of the utility power grid converter.

7. A method for braking a wind turbine coupled to a utility power grid, the method comprising detecting a loss of power in the utility power grid, and, in response:
   extracting energy from rotational inertia of the wind turbine via a generator and a generator converter and using the energy to charge a DC link capacitor; and
   using the extracted energy stored in the DC link capacitor to provide power to an electrically-powered blade pitch actuator via an emergency power supply bus to pitch turbine blades of the wind turbine into a feathered position.

8. The method of claim 7, further comprising:
   switching over to a filtered power output from the utility power grid to the emergency power supply bus;
   storing transient power provided during the switch-over, in a ride-through capacitor; and
   using the transient power stored in the ride-through capacitor to maintain proper operation during the switch-over.

9. The method of claim 8, wherein detecting a loss of power in the utility power grid comprises sensing an undervoltage or out of frequency condition and the step of switching over to a filtered power output comprises dropping main contactors of the utility power grid, and rerouting auxiliary power feed off the utility power grid.

10. The method of claim 7, comprising the additional steps, upon a loss of power in the utility power grid, of:
    isolating the DC link from the utility power grid;
    providing the extracted energy stored in the DC link capacitor, to the pitch actuator, via the emergency power supply bus.

11. The method of claim 10, wherein detecting a loss of power in the utility power grid comprises sensing an undervoltage or out of frequency condition and isolating the DC link from the utility power grid comprises turning off gating signals of the utility power grid converter.

* * * * *